United States Patent
Moon

(10) Patent No.: US 8,405,762 B2
(45) Date of Patent: Mar. 26, 2013

(54) METHOD AND APPARATUS FOR DETECTING TRAVELING CHARACTERISTICS OF SHUTTER

(75) Inventor: Jae-joon Moon, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 279 days.

(21) Appl. No.: 12/842,595

(22) Filed: Jul. 23, 2010

(65) Prior Publication Data

US 2011/0019070 A1    Jan. 27, 2011

(30) Foreign Application Priority Data

Jul. 24, 2009   (KR) .................. 10-2009-0067828

(51) Int. Cl.
*H04N 5/235* (2006.01)
*G03B 7/00* (2006.01)

(52) U.S. Cl. .................... 348/362; 348/222.1

(58) Field of Classification Search .............. 348/221.1, 348/296, 362
See application file for complete search history.

(56) References Cited

U.S. PATENT DOCUMENTS

| 6,542,194 | B1 | 4/2003 | Juen |
| 2006/0087573 | A1 | 4/2006 | Harada |
| 2008/0291306 | A1* | 11/2008 | Totori .................. 348/296 |

FOREIGN PATENT DOCUMENTS

| JP | 11-041523 | | 2/1999 |
| JP | 2006-101492 | | 4/2006 |
| JP | 2007-282128 | | 10/2007 |
| JP | 2008067234 | * | 3/2008 |
| JP | 2008147979 | * | 6/2008 |
| JP | 2008-278335 | | 11/2008 |

* cited by examiner

*Primary Examiner* — Gevell Selby
(74) *Attorney, Agent, or Firm* — The Farrell Law Firm, P.C.

(57) ABSTRACT

A method and apparatus are provided for detecting traveling characteristics of a mechanical shutter. After performing a reset scan operation on a plurality of pixels of an imaging device, first quantities of light are detected by reading pixels of even rows or odd rows of the imaging device. The imaging device is shielded from light by causing a mechanical trailing curtain included in the shutter to travel. Second quantities of light are detected by reading pixels of rows that are different from the rows read to detect the first quantities of light. Traveling characteristics of the mechanical trailing curtain are obtained based on the first quantities of light and the second quantities of light.

20 Claims, 9 Drawing Sheets

METHOD AND APPARATUS FOR DETECTING TRAVELING CHARACTERISTICS OF SHUTTER

PRIORITY

This application claims priority under 35 U.S.C. §119(a) to Korean Patent Application No. 10-2009-0067828, filed on Jul. 24, 2009, in the Korean Intellectual Property Office, the disclosure of which is incorporated herein by reference.

BACKGROUND OF THE INVENTION

1. Field of the Invention

The present invention relates generally to a method and apparatus for detecting traveling characteristics of a shutter, and more particularly, to a method and apparatus for detecting traveling characteristics of a mechanical shutter and realizing an electronic leading curtain.

2. Description of the Related Art

A camera system that uses a focal plane shutter generally includes a leading curtain and a trailing curtain. Both the leading curtain and trailing curtain travel in front of an imaging device of the camera system so that a subject incident from a lens is exposed on an imaging surface of the imaging device. The imaging surface is exposed according to travelling of the leading curtain, which begins exposure. After a predetermined time elapses, the trailing curtain travels according to a shutter speed, thus completing photographing of the subject. The leading curtain and trailing curtain generally have a mechanical structure, and thus, the leading curtain and trailing curtain are referred to as a mechanical leading curtain and a mechanical trailing curtain.

Travelling of the mechanical leading curtain or the mechanical trailing curtain generates vibration in the imaging device. Such a vibration adversely affects photographing. Furthermore, the mechanical leading curtain travels in order to initiate an exposure operation performed on the imaging surface during the operation of the focal plane shutter. In this regard, the mechanical leading curtain collides with a shutter substrate at the time when the travelling of the mechanical leading curtain ends, and thus a shock vibration is generated. Since performance of the exposure operation is initiated on the imaging surface, vibration of the imaging surface adversely affects photographing.

SUMMARY OF THE INVENTION

The present invention has been made to address at least the above problems and/or disadvantages and to provide at least the advantages described below. Accordingly, an aspect of the present invention provides a method and apparatus for detecting traveling characteristics of a shutter of a camera using a mechanical leading curtain or a mechanical trailing curtain included in the shutter.

Another aspect of the present invention provides a method and apparatus for realizing an electronic leading curtain in accordance with traveling characteristics of a mechanical leading curtain or a mechanical trailing curtain.

According to one aspect of the present invention, a method is provided for detecting traveling characteristics of a mechanical shutter of a camera having an imaging device with a plurality of pixels arranged in a pixel array, which has rows and columns, and a shutter for adjusting a quantity of light exposure on the imaging device. After performing a reset scan operation on the plurality of pixels of the imaging device, first quantities of light are detected by reading pixels of even rows or odd rows of the imaging device. The imaging device is shielded from light by causing a mechanical trailing curtain included in the shutter to travel. Second quantities of light are detected by reading pixels of rows that are different from the rows read to detect the first quantities of light. Traveling characteristics of the mechanical trailing curtain are obtained based on the first quantities of light and the second quantities of light.

According to another aspect of the present invention, a method is provided for detecting traveling characteristics of a mechanical shutter of a camera having an imaging device with a plurality of pixels arranged in a pixel array, which has rows and columns, and a shutter for adjusting a quantity of light exposure on the imaging device. After performing a reset scan operation on the plurality of pixels of the imaging device, an exposure operation is initiated on the imaging device by causing a mechanical leading curtain included in the shutter to travel. After the exposure operation is performed, first quantities of light are detected by reading pixels of even rows or odd rows of the imaging device. After the first quantities of light are detected, second quantities of light are detected by reading pixels of rows that are different from the rows read to detect the first quantities of light. Traveling characteristics of the mechanical leading curtain are obtained based on the first quantities of light and the second quantities of light.

According to an additional aspect of the present invention, an apparatus is provided for detecting traveling characteristics of a mechanical shutter of a camera having an imaging device with a plurality of pixels arranged in a pixel array, which has rows and columns, and a shutter for adjusting a quantity of light exposure on the imaging device. The apparatus includes a reset scanning unit for performing a reset scan operation on the plurality of pixels of the imaging device, and a shutter driving unit for shielding the imaging device from light by causing a mechanical trailing curtain included in the shutter to travel. The apparatus also includes a quantity of light detecting unit for detecting first quantities of light by reading pixels of even rows or odd rows of the imaging device before causing the mechanical trailing curtain to travel after performing the reset scan operation, and detecting second quantities of light by reading pixels of rows that are different from the rows read to detect the first quantities of light after shielding the imaging device from light by the mechanical trailing curtain. The apparatus additionally includes a mechanical shutter traveling characteristics detecting unit for obtaining traveling characteristics of the mechanical trailing curtain based on the first quantities of light and the second quantities of light.

According to a further aspect of the present invention, an apparatus is provided for detecting traveling characteristics of a mechanical shutter of a camera having an imaging device with a plurality of pixels arranged in a pixel array, having rows and columns and a shutter for adjusting a quantity of exposure light of the imaging device. The apparatus includes a reset scanning unit for performing a reset scan operation on the plurality of pixels of the imaging device, and a shutter driving unit for initiating an exposure operation on the imaging device by causing a mechanical leading curtain included in the shutter to travel after performing the reset scan operation. The apparatus also includes a quantity of light detecting unit for detecting first quantities of light by reading pixels of even rows or odd rows of the imaging device after performing the exposure operation on the image device, and detecting second quantities of light by reading pixels of rows that are different from the rows read to detect the first quantities of light after detecting the first quantities of light. The apparatus additionally includes a mechanical shutter traveling characteristics detecting unit for obtaining traveling characteristics of the mechanical leading curtain based on the first quantities of light and the second quantities of light.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
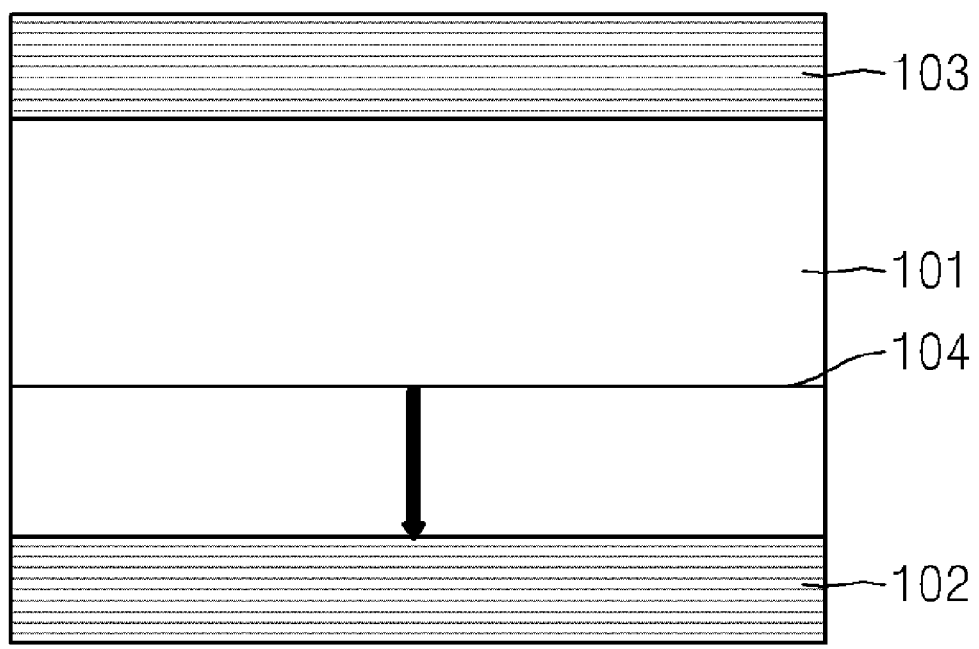
FIG. 1 is a diagram illustrating a structure of a shutter, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Referring initially to FIG. 1, a diagram illustrates a structure of a shutter, according to an embodiment of the present invention. An imaging device 101 is a photoelectric conversion device for converting incident optical light into an electrical signal. For example, the imaging device 101 is an image sensor. The image sensor includes a plurality of pixels arranged as a pixel array having rows and columns. Types of image sensors include a Charge Coupled Device (CCD) image sensor, a Complimentary Metal-Oxide Semiconductor (CMOS) image sensor, and the like.

The imaging device 101 includes a shutter for controlling exposure. The shutter includes a mechanical leading curtain 102 and a mechanical trailing curtain 103 that travel in front of the imaging device 101 to allow the imaging device 101 to initiate an exposure operation and perform a photographing operation. According to the traveling of the mechanical leading curtain 102, the imaging device 101 initiates the exposure operation. According to the traveling of the mechanical trailing curtain 103, the imaging device 101 is shielded from light.

The shutter includes an electronic leading curtain 104 that functions as the mechanical leading curtain 102 by sequentially scanning a reset signal for initiating an exposure with respect to each pixel in pixel line units in the imaging device.

Methods of detecting traveling characteristics of a mechanical trailing curtain and realizing an electronic leading curtain are described in detail below with reference to FIGS. 2 through 6.

Figure 2:
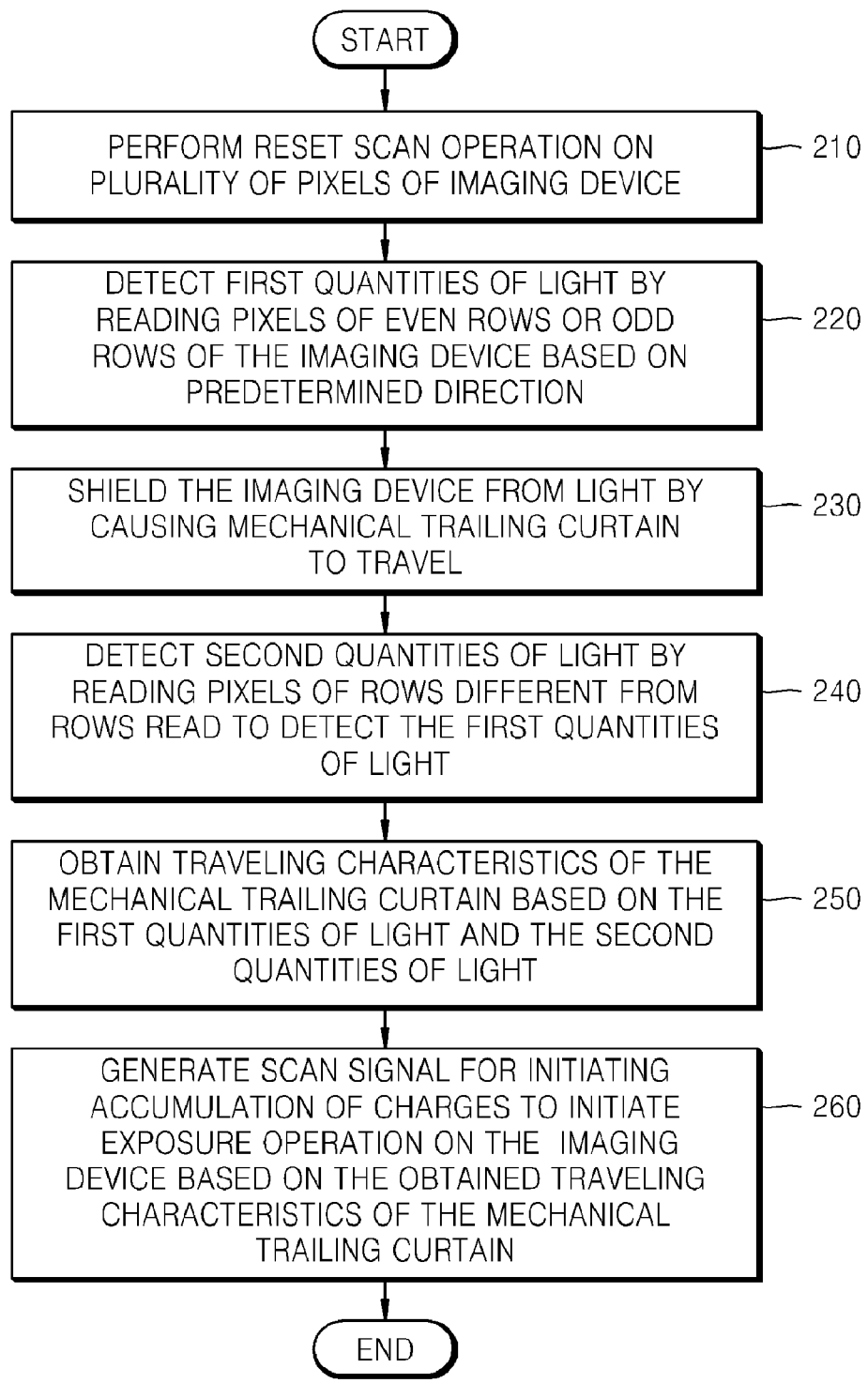
FIG. 2 is a flowchart illustrating a method of detecting traveling characteristics of a mechanical trailing curtain, according to an embodiment of the present invention.

FIG. 2 is a flowchart illustrating a method of detecting traveling characteristics of a mechanical trailing curtain, according to an embodiment of the present invention. The operation of detecting the traveling characteristics of the mechanical trailing curtain is described with reference to FIG. 3.

Figure 3:
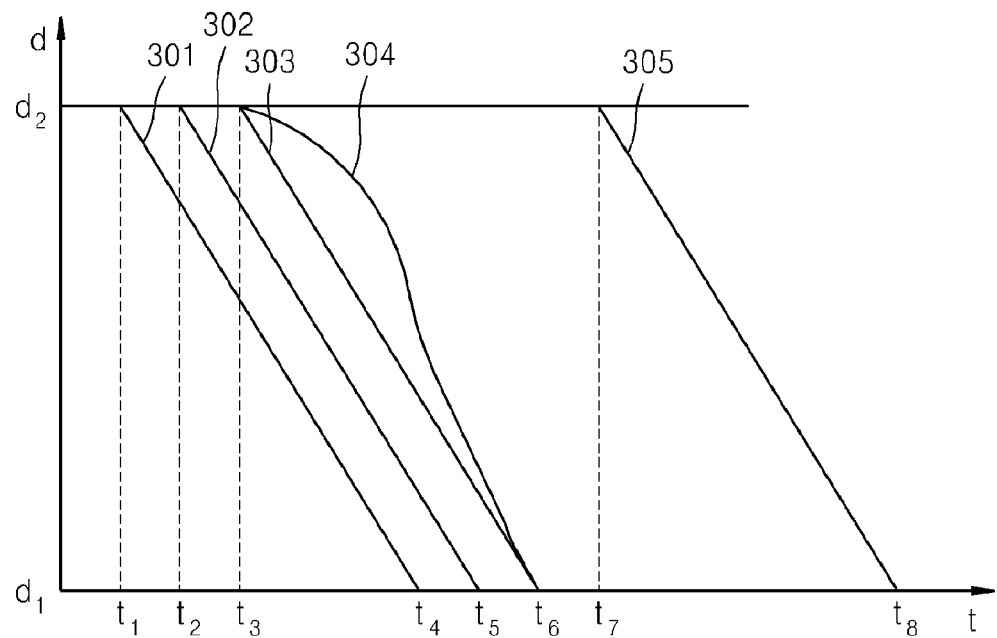
FIG. 3 is a graph of a reset scanning line, first and second readout scanning lines, and traveling lines of a mechanical trailing curtain relating to traveling characteristics of the mechanical trailing curtain, according to an embodiment of the present invention.

FIG. 3 is a graph of a reset scanning line 301, first and second readout scanning lines 302 and 305, and traveling lines 303 and 304 of a mechanical trailing curtain relating to traveling characteristics of the mechanical trailing curtain, according to an embodiment of the present invention. Referring to FIG. 3, a horizontal axis indicates a time t, and a vertical axis indicates a vertical length d of an imaging device. In the vertical axis, $d_1$ denotes a lowest point of the vertical length d, and $d_2$ denotes a highest point of the vertical length d.

Referring to FIG. 2, a reset scan operation is performed on a plurality of pixels of an imaging device at a predetermined speed in step 210. Reset scanning sets a quantity of charges accumulated in the pixels as 0. A speed of reset scanning is equal to a traveling speed of the mechanical trailing curtain. Referring to FIG. 3, a reset scanning time $t_1$~$t_4$ is equal to a traveling time $t_3$~$t_6$ of the mechanical trailing curtain. The reset scanning line 301 has linearity.

After the reset scanning operation is performed, first quantities of light are detected by reading pixels of even rows of the imaging device, or odd rows thereof, in a predetermined direction, in step 220. The imaging device, for example, an image sensor, converts a light incident after the reset scanning operation into an electrical signal, i.e., a charge. Thereafter, the image sensor converts accumulated charges into an analog voltage and outputs the analog voltage when receiving a readout signal. The image sensor determines the quantity of incident light based on the output voltage. The predetermined direction is a direction in which a trailing curtain travels. For example, when the mechanical trailing curtain travels left and right, quantities of light with respect to pixels of a predetermined row are read out in a horizontal direction. When the mechanical trailing curtain travels up and down, quantities of light with respect to pixels of a predetermined row are read out in a vertical direction. If a traveling direction of the mechanical trailing curtain is different from a readout direction thereof, quantities of light are not uniformly supplied to the entire screen of the image sensor. The first readout scanning line 302 is related to pixels of selected even rows or selected odd rows. A scanning time $t_2\sim t_5$ of the first readout scanning line 302 is equal to the reset scanning time $t_1\sim t_4$ and the traveling time $t_3\sim t_6$ of the mechanical trailing curtain.

After the first quantities of light are detected, the mechanical trailing curtain travels, and thus, the imaging device is shielded from light, in step 230. The traveling line 304 is a traveling line of a substantial mechanical trailing curtain. The mechanical trailing curtain has an inconsistent traveling speed due to a restitution force of a spring. Specifically, a speed of a trailing curtain is relatively slow at the time when the trailing curtain starts traveling, and the speed thereof is relatively fast at the time when the trailing curtain ends traveling. Furthermore, the speed of the trailing curtain varies according to temperature, humidity, a change in the orientation of a camera, and the like. Thus, the traveling line 304 of the substantial mechanical trailing curtain is non-linear. The traveling line 303 is a traveling line of an ideal mechanical trailing curtain having a consistent traveling speed.

After the imaging device is shielded from light, second quantities of light are detected by reading pixels of rows that are different from the rows read to detect the first quantities of light, in step 240. If the first quantities of light are detected by reading pixels of even rows, the second quantities of light are detected by reading pixels of odd rows. The second readout scanning line 305 is related to pixels of rows that are different from the rows read to detect the first quantities of light. If the first readout scanning line 302 is related to pixels of even rows, the second readout scanning line 305 is related to pixels of odd rows. A scanning time $t_7\sim t_8$ of the second readout scanning line 305 is equal to the scanning time $t_2\sim t_5$ of the first readout scanning line 302.

The traveling characteristics of the mechanical trailing curtain are obtained based on the detected first and second quantities of light, in step 250. The detected first quantities of light are summed and the detected second quantities of light are summed. The traveling characteristics of the mechanical trailing curtain are obtained by comparing the summed first quantities of light with the summed second quantities of light. For an ideal mechanical trailing curtain, the summed first quantities of light and the summed second quantities of light are equal to each other. However, since the traveling characteristics of a mechanical trailing curtain are not consistent like the traveling line 304 of the mechanical trailing curtain, the summed first quantities of light and the summed second quantities of light are different from each other. The traveling characteristics of the mechanical trailing curtain are obtained according to the difference between the summed first quantities of light and the summed second quantities of light, which is described in detail with reference to FIG. 4.

Figure 4:
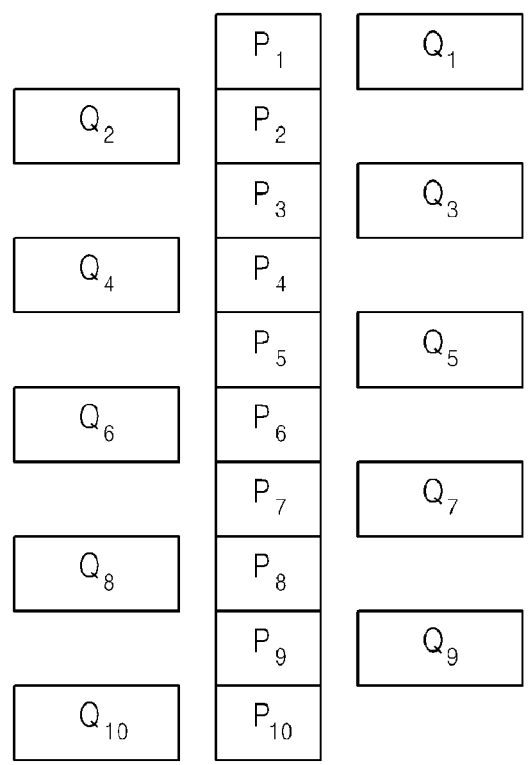
FIG. 4 is a diagram illustrating quantities of light detected from a predetermined region, according to an embodiment of the present invention.

FIG. 4 is a diagram illustrating quantities of light detected from a predetermined region, according to an embodiment of the present invention. P1 through P10 denote pixels in the predetermined region. P1, P3, P5, P7, and P9 denote pixels of odd rows of the predetermined region. P2, P4, P6, P8, and P10 denote pixels of even rows of the predetermined region. Q1 through Q10 denote quantities of light detected from the pixels P1 through P10 of the predetermined region. Q1, Q3, Q5, Q7, and Q9 denote quantities of light detected from the pixels of the odd rows of the predetermined region. Q2, Q4, Q6, Q8, and Q10 denote quantities of light detected from the pixels of the even rows of the predetermined region. In terms of an ideal mechanical trailing curtain, a value of $\Sigma Q_{even}$ and a value of $\Sigma Q_{odd}$ are equal to each other. However, since the traveling characteristics of a mechanical trailing curtain are not consistent, i.e., the mechanical trailing curtain is non-linear, the value of $\Sigma Q_{even}$ and the value of $\Sigma Q_{odd}$ are different from each other. The traveling characteristics of the mechanical trailing curtain are obtained according to the difference between the value of $\Sigma_{even}$ and the value of $\Sigma Q_{odd}$. Comparing summed quantities of light is merely an embodiment of the present invention, and the traveling characteristics of the mechanical trailing curtain may be detected based on quantities of light in various ways.

Referring again to FIG. 2, a scan signal is generated in step 260. The scan signal has the same characteristics as the obtained traveling characteristics of the mechanical trailing curtain and is used to initiate accumulation of charges in order to allow the imaging device to initiate an exposure operation. Specifically, the scan signal, for realizing an electronic leading curtain having a scan pattern corresponding to the traveling characteristics of the mechanical trailing curtain, is generated. The electronic leading curtain and the mechanical trailing curtain having the same traveling characteristics make it possible to perform a photographing operation with an exact quantity of exposure light. The same traveling characteristics will be described with reference to FIG. 5.

Figure 5:
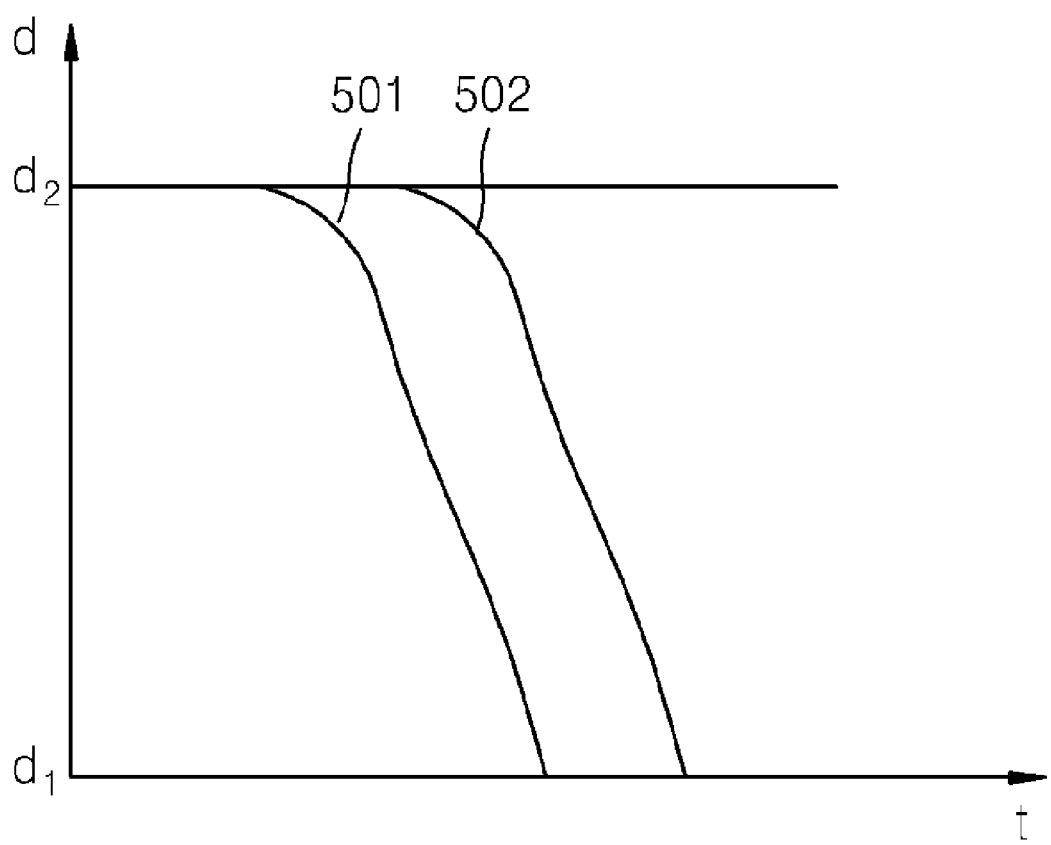
FIG. 5 is a graph of a scanning line of an electronic leading curtain and a traveling line of a mechanical trailing curtain corresponding to the traveling characteristics of the mechanical trailing curtain, according to an embodiment of the present invention.
Figure 6:
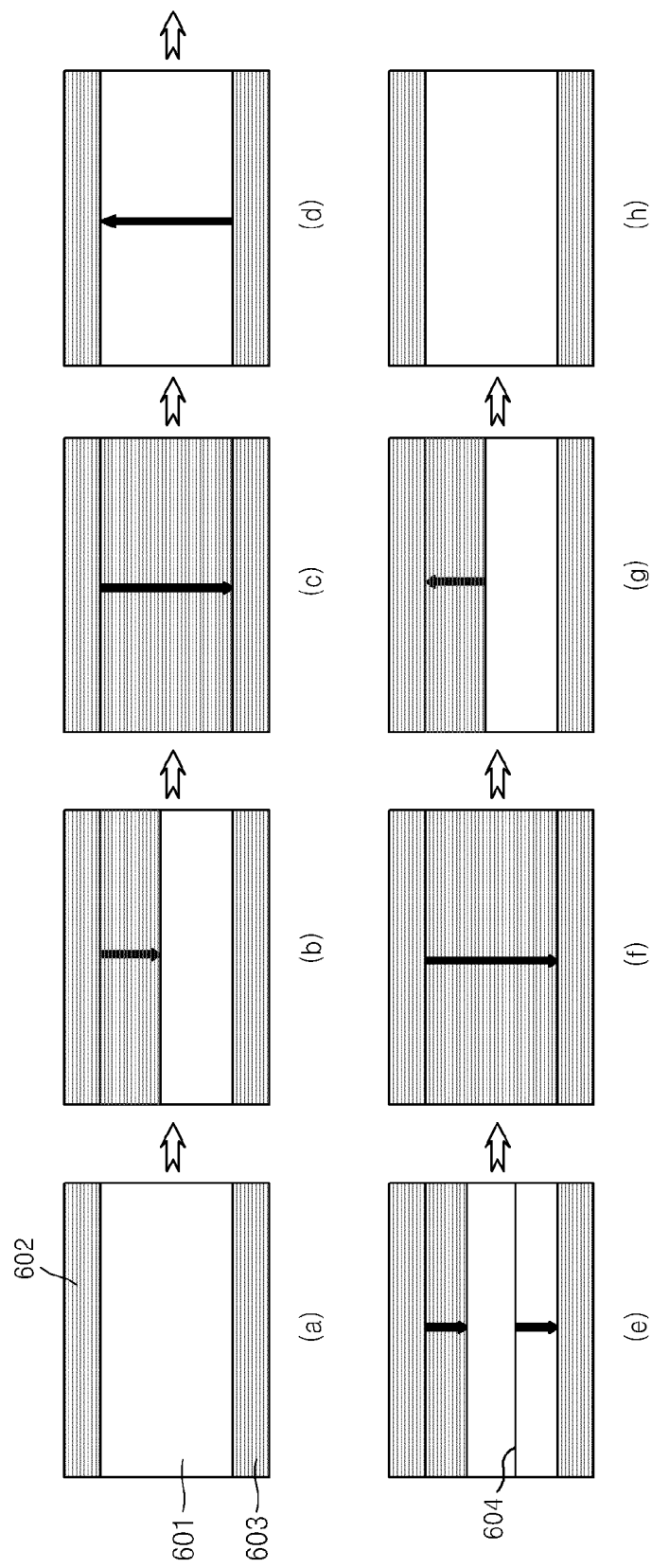
FIGS. 6A-6H are diagrams illustrating an operation of detecting traveling characteristics of a mechanical trailing curtain in a live view mode and performing a camera photographing operation using the mechanical trailing curtain and an electronic leading curtain generated based on the detected traveling characteristics, according to an embodiment of the present invention.

FIG. 5 is a graph illustrating a scanning line 501 of an electronic leading curtain and a traveling line 502 of a mechanical trailing curtain corresponding to the traveling characteristics of the mechanical trailing curtain, according to an embodiment of the present invention. A horizontal axis indicates a time t, and a vertical axis indicates a vertical length d of an imaging device. In the vertical axis, $d_1$ denotes a lowest point of the vertical length d, and $d_2$ denotes a highest point of the vertical length d, as in FIG. 3. The scanning line 501 of the electronic leading curtain and the traveling line 502 of the mechanical trailing curtain have the same characteristics.

When there is no change in the orientation of a camera after a photographing operation is performed, the photographing operation is continuously performed using the realized electronic leading curtain. Meanwhile, when there is a change in orientation of the camera, the currently detected traveling characteristics of the mechanical trailing curtain are not equal to the traveling characteristics of the mechanical trailing curtain according to the changed orientation of the camera. Thus, the traveling characteristics of the mechanical trailing curtain must be detected by causing the mechanical trailing curtain to travel again. In an embodiment of the present invention, when there is a change in orientation of the camera, the orientation of the camera is detected. Thereafter, a scan signal, i.e., an electronic leading curtain scan signal, for initiating accumulation of charges is corrected using orientation change correction data corresponding to the detected orientation of the camera. Specifically, when the orientation of the camera is changed, the traveling characteristics of the electronic leading curtain are corrected according to the scan profile characteristics that are changed according to the changed orientation of the camera.

According to another embodiment of the present invention, pixels of even rows and odd rows of all regions of an imaging device are not detected, and pixels of even rows and odd rows of a partial region of the imaging device may be detected. In this case, a partial region of the imaging device is selected, a reset scanning operation is performed only in the selected region, and first and second quantities of light are detected. A plurality of regions of the imaging device may be selected.

Furthermore, the number of regions and the number of pixels of even rows and odd rows may be adjusted according to a shutter speed and a reading speed. For example, the number of selected partial regions is 5, and the number of pixels of each region is 20. The total number of pixels to be read is 100. If a reading time of each pixel is 1 ms, the total reading time is 100 ms. If the total reading time must be shorter than 100 ms, the number of selected partial regions must be below 5, or the number of pixels of each region must be below 20.

FIGS. 6A-6H are diagrams illustrating an operation of detecting traveling characteristics of a mechanical trailing curtain 602 in a live view mode and performing a camera photographing operation using the mechanical trailing curtain 602 and an electronic leading curtain 604 generated based on the detected traveling characteristics, according to an embodiment of the present invention. The mechanical trailing curtain 602 shields an imaging device 601 from light, a mechanical leading curtain 603 initiates an exposure operation to the imaging device 601, and the electronic leading curtain 604 functions as the mechanical leading curtain 603. The imaging device 601 may not include the mechanical leading curtain 603. Referring to FIGS. 6A, 6D, and 6H, the mechanical trailing curtain 602 and the mechanical leading curtain 603 are folded at top and bottom ends of the imaging device 601, respectively, in the live view mode. FIGS. 6A, 6B, and 6C show a series of processes of detecting the traveling characteristics of the mechanical trailing curtain 602. Referring to FIG. 6A, a reset scan operation is performed on a plurality of pixels of the imaging device 601 at the same speed as a shutter speed. Thereafter, pixels of even rows are read and quantities of light are detected. Alternatively, pixels of odd rows are read and quantities of light are detected. Referring to FIG. 6B, the mechanical trailing curtain 602 travels to the lower end of the imaging device 601. Referring to FIG. 6C, the imaging device 601 is completely shielded from light by the mechanical trailing curtain 602. Thereafter, when the imaging device 601 is shielded from light, if the pixels of even rows are read in FIG. 6A, the pixels of odd rows are read and the quantities of light are detected, and if the pixels of odd rows are read in FIG. 6A, the pixels of even rows are read and the quantities of light are detected. Referring to FIG. 6D, the mechanical trailing curtain 602 is raised in the live view mode again.

FIGS. 6E and 6F show processes of performing the camera photographing operation by using the mechanical trailing curtain 602 and the electronic leading curtain 604 generated based on the traveling characteristics of the mechanical trailing curtain 602. Referring to FIG. 6E, the electronic leading curtain 604, having a scan pattern corresponding to the traveling characteristics of the mechanical trailing curtain 602, first operates according to a photographing command, and the mechanical trailing curtain 602 operates according to a predetermined shutter speed, so that the camera photographing operation is performed. The mechanical trailing curtain 602 can initiate the operation after the electronic leading curtain 604 completes the operation. Referring to FIG. 6F, the mechanical trailing curtain 602 completes the operation and the imaging device 601 is completely shielded from light. At this time, the camera photographing operation ends. Thereafter, in order to return the mechanical trailing curtain 602 to the live view mode, referring to FIGS. 6G and 6H, the mechanical trailing curtain 602 is raised again by a motor.

Methods of detecting traveling characteristics of a mechanical leading curtain and realizing an electronic leading curtain, according to another embodiment of the present invention, are described with reference to FIGS. 7 and 8. In an embodiment of the present invention, an imaging device must include the mechanical leading curtain, a mechanical trailing curtain, and the electronic leading curtain. Descriptions of the elements of FIGS. 7 and 8 that are the same as those described with reference to FIG. 2 or 5, are not be repeated or are only briefly provided.

Figure 7:
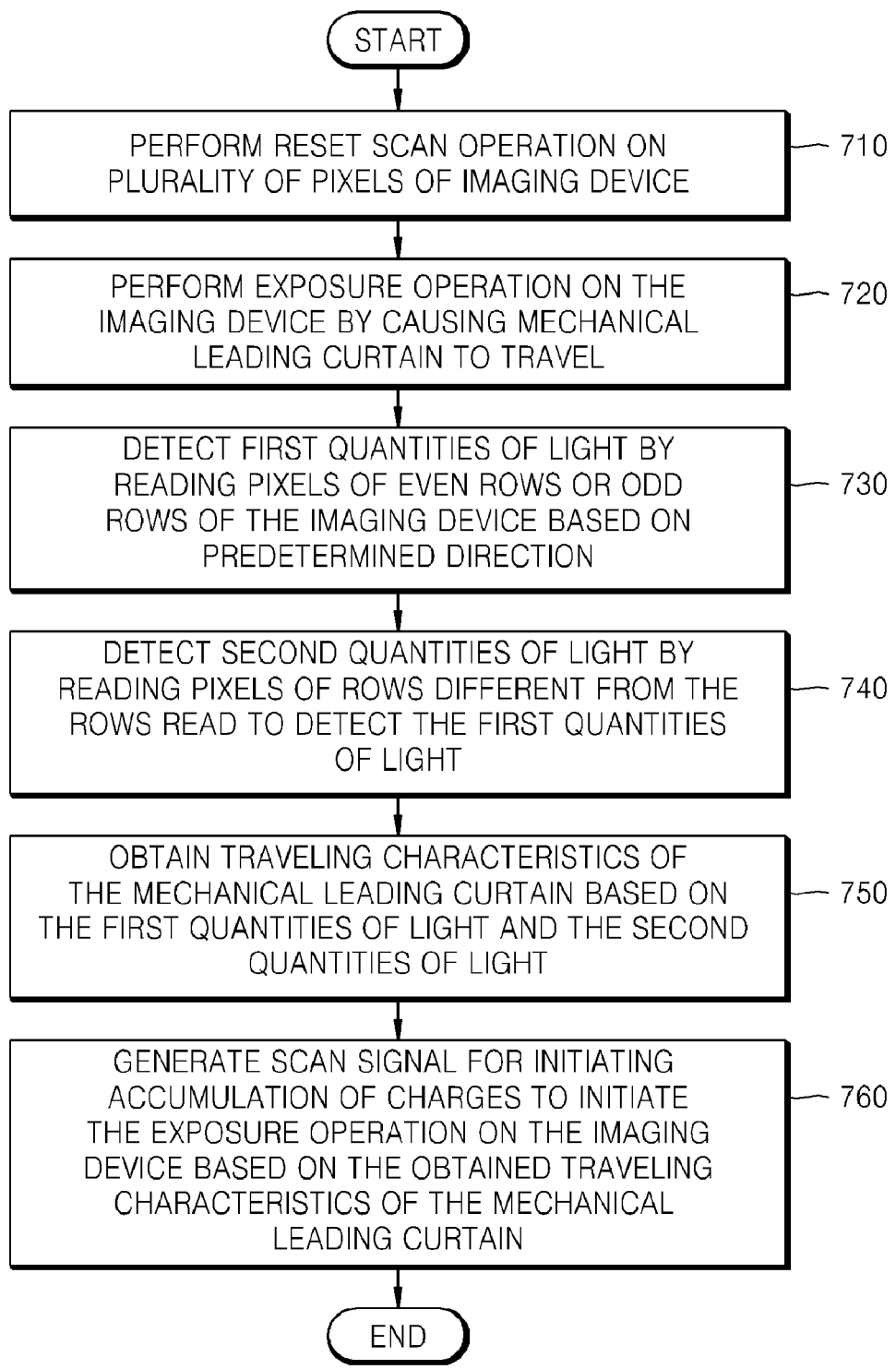
FIG. 7 is a flowchart illustrating a method of detecting traveling characteristics of a mechanical leading curtain, according to another embodiment of the present invention.

FIG. 7 is a flowchart illustrating a method of detecting traveling characteristics of a mechanical leading curtain, according to another embodiment of the present invention. The operation of detecting traveling characteristics of the mechanical leading curtain is described with reference to FIG. 8.

Figure 8:
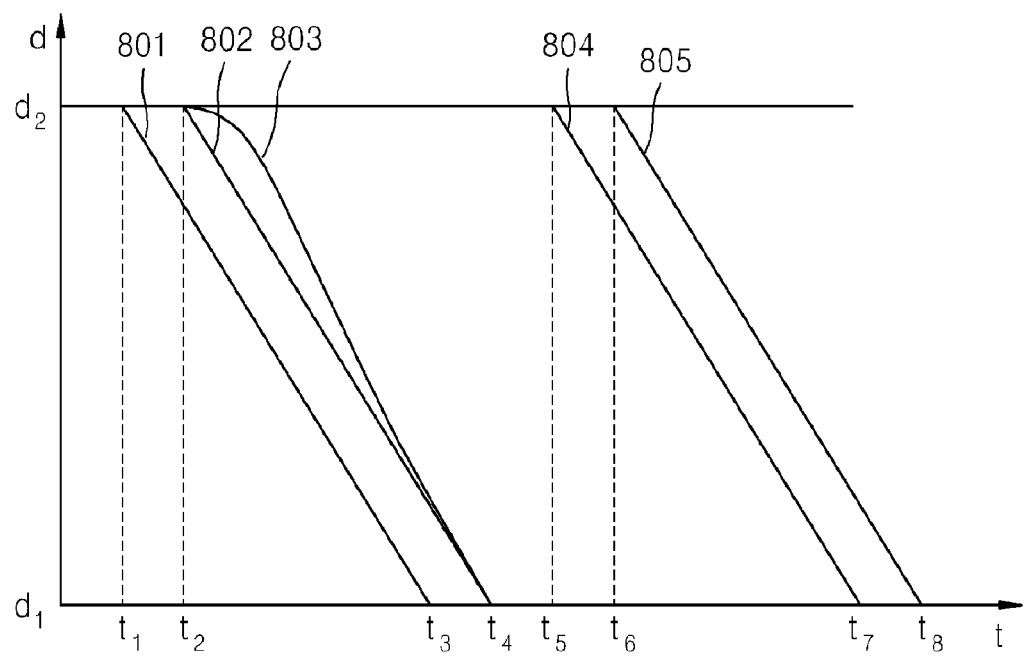
FIG. 8 is a graph of a reset scanning line, first and second readout scanning lines, and traveling lines of a mechanical leading curtain relating to traveling characteristics of the mechanical leading curtain, according to another embodiment of the present invention.

FIG. 8 is a graph illustrating a reset scanning line 801, first and second readout scanning lines 804 and 805, and traveling lines 802 and 803 of a mechanical leading curtain relating to traveling characteristics of the mechanical leading curtain, according to another embodiment of the present invention. Referring to FIG. 8, a horizontal axis indicates a time t, and a vertical axis indicates a vertical length d of an imaging device. In the vertical axis, $d_1$ denotes a lowest point of the vertical length d, and $d_2$ denotes a highest point of the vertical length d.

Referring to FIG. 7, a reset scan operation is performed on a plurality of pixels of an imaging device at a predetermined speed in step 710. Referring to FIG. 8, a reset scanning time $t_1 \sim t_3$ is equal to a traveling time $t_2 \sim t_4$ of the mechanical leading curtain.

After the reset scan operation is performed, an exposure operation is initiated on the imaging device in step 720. The traveling line 803 indicates a traveling line of a substantial mechanical leading curtain. A traveling speed of the substantial mechanical leading curtain is inconsistent, like in the case of the traveling speed of the mechanical trailing curtain described with reference to FIG. 3. Thus, the traveling line 803 of the substantial mechanical leading curtain is non-linear. The traveling line 802 indicates a traveling line of an ideal mechanical leading curtain having a consistent traveling speed.

After the exposure operation is initiated on the imaging device, first quantities of light are detected by reading pixels of even rows of the imaging device, or odd rows thereof, in a predetermined direction in step 730. The predetermined direction is a direction in which the mechanical leading curtain travels. The first readout scanning line 804 is related to pixels of selected even rows or selected odd rows. A scanning time $t_5 \sim t_7$ of the first readout scanning line 804 is equal to the reset scanning time $t_1 \sim t_3$ and the traveling time $t_2 \sim t_4$ of the mechanical leading curtain.

After the first quantities of light are detected, second quantities of light are detected by reading pixels of rows that are different from the rows read to detect the first quantities of light, in step 740. If the first quantities of light are detected by reading pixels of even rows, the second quantities of light are detected by reading pixels of odd rows. The second readout scanning line 805 is related to pixels of rows that are different from the rows read to detect the first quantities of light. If the first readout scanning line 804 is related to pixels of even rows, the second readout scanning line 805 is related to pixels of odd rows. A scanning time $t_6 \sim t_8$ of the second readout scanning line 805 is equal to the scanning time $t_5 \sim t_7$ of the first readout scanning line 804.

The traveling characteristics of the mechanical leading curtain are obtained based on the detected first and second quantities of light in step 750. The method of obtaining the traveling characteristics of the mechanical leading curtain is the same as the method of obtaining the traveling characteristics of the mechanical trailing curtain described with reference to FIG. 2. In the case of an ideal mechanical trailing curtain, the first quantities of light that are summed and the second quantities of light that are summed are equal to each other. However, the traveling characteristics of the mechanical leading curtain are non-linear. Spaces of even rows and spaces of odd rows are different from each other due to the non-linear traveling characteristics of the mechanical leading curtain. Such differences in the spaces result in a difference in quantities of exposure. Thus, the summed first quantities of light and the summed second quantities of light are different from each other. Comparing summed quantities of light is merely an embodiment of the present invention, and the traveling characteristics of the mechanical leading curtain may be detected based on quantities of light in various ways.

A scan signal is generated in step 760, which is used to initiate accumulation of charges in order to allow the imaging device to initiate an exposure operation based on the obtained traveling characteristics of the mechanical leading curtain. Specifically, the scan signal for realizing an electronic leading curtain having a scan pattern corresponding to the traveling characteristics of the mechanical leading curtain is generated. For example, in FIG. 5, the scanning line 501 of the electronic leading curtain corresponding to the traveling characteristics of the mechanical leading curtain and the traveling line 502 of the mechanical trailing curtain have the same characteristics.

When there is no change in the orientation of a camera after a photographing operation is performed, the photographing operation is continuously performed using the realized electronic leading curtain. Meanwhile, when there is a change in the orientation of the camera, the orientation of the camera is detected. Thereafter, an electronic leading curtain scan signal is corrected using orientation change correction data corresponding to the detected orientation of the camera. When there is a mechanical leading curtain, although the orientation of the camera is changed, the electronic leading curtain scan signal may be corrected by detecting the traveling characteristics of the mechanical leading curtain. Specifically, when there is a change in orientation of the camera after the photographing operation is performed, the mechanical leading curtain travels immediately after the mechanical trailing curtain and the mechanical leading curtain together is raised. The traveling characteristics of the mechanical leading curtain may be detected as described above. The electronic leading curtain scan signal may be corrected according to the detected traveling characteristics of the mechanical leading curtain. Although there is a change in orientation of the camera, it is possible to efficiently realize the exact electronic leading curtain.

The time taken to detect the traveling characteristics of the mechanical leading curtain is shorter than the time taken to detect the traveling characteristics of the mechanical trailing curtain after the photographing operation is performed. When the traveling characteristics of the mechanical trailing curtain are detected, since the mechanical trailing curtain is continuously lowered and then raised again, a lot of charging time is required to drive the mechanical trailing curtain. However, when the traveling characteristics of the mechanical leading curtain are detected, since it is possible to charge the mechanical leading curtain during the time taken to charge the mechanical trailing curtain after the photographing operation is performed, it is possible to detect the traveling characteristics of the mechanical leading curtain during the time taken to lower the mechanical leading curtain.

A method of detecting the traveling characteristics of the mechanical leading curtain may not read pixels of even rows and odd rows of the entire region of the imaging device, and instead may read pixels of even rows and odd rows of a partial region of the imaging device, like the method of detecting the traveling characteristics of the mechanical trailing curtain.

FIGS. 9A-9J are diagrams illustrating an operation of detecting traveling characteristics of a mechanical leading curtain 903 in a live view mode and performing a camera photographing operation using a mechanical trailing curtain 902 and an electronic leading curtain 904 generated based on the detected traveling characteristics, according to another embodiment of the present invention.

Figure 9:
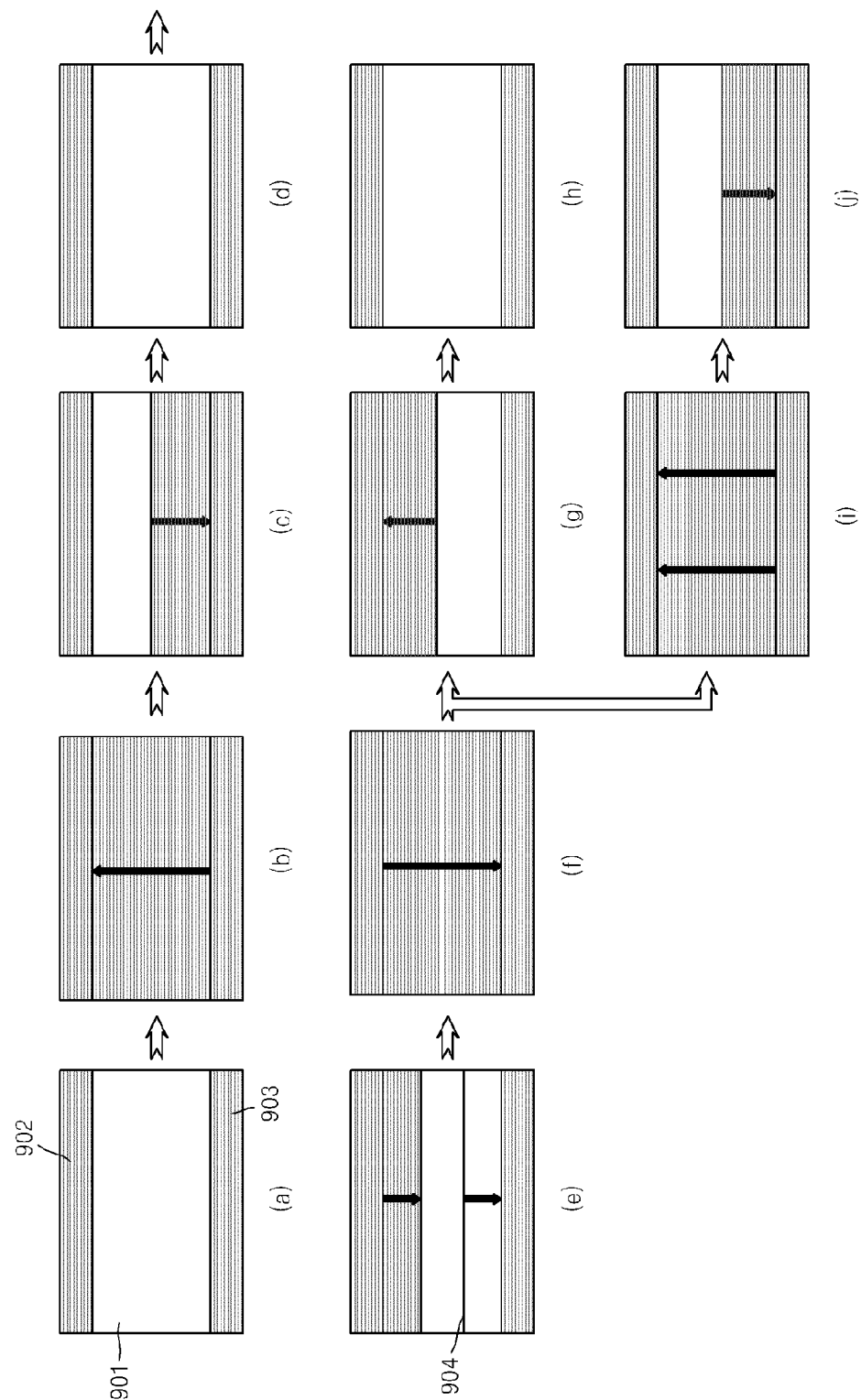
FIGS. 9A through 9J are diagrams illustrating an operation of detecting traveling characteristics of a mechanical leading curtain in a live view mode and performing a camera photographing operation using a mechanical trailing curtain and an electronic leading curtain generated based on the detected traveling characteristics, according to another embodiment of the present invention.

Referring to FIGS. 9A through 9J, the mechanical trailing curtain 902 shields an imaging device 901 from light, the mechanical leading curtain 903 initiates an exposure operation on the imaging device 901, and the electronic leading curtain 904 functions as the mechanical leading curtain 903. Referring to FIGS. 9A, 9D, and 9H, the mechanical trailing curtain 902 and the mechanical leading curtain 903 are folded at top and bottom ends of the imaging device 901 in the live view mode. FIGS. 9A-9D show a series of processes for detecting the traveling characteristics of the mechanical leading curtain 903. Referring to FIG. 9A, a reset scan operation is performed on a plurality of pixels of the imaging device 901 at the same speed as a shutter speed. Referring to FIG. 9B, the mechanical leading curtain 903 travels to a top end of the imaging device 901. Referring to FIG. 9C, the imaging device 901 is completely shielded from light by the mechanical leading curtain 903. Referring to FIG. 9D, quantities of light are detected by reading pixels of even rows of the imaging device 901. Alternatively, quantities of light may be detected by reading pixels of odd rows of the imaging device 901. After a predetermined period of time elapses, when the pixels of the even rows are read, the quantities of light may be detected by reading the pixels of the odd rows, and when the pixels of the odd rows are read, the quantities of light may be detected by reading the pixels of the even rows.

FIGS. 9E and 9F show a process for performing the camera photographing operation using the mechanical trailing curtain 902 and the electronic leading curtain 904 generated based on the traveling characteristics of the mechanical leading curtain 903. Referring to FIG. 9E, the electronic leading curtain 904, having a scan pattern corresponding to the traveling characteristics of the mechanical leading curtain 903, first operates according to a photographing command, and the mechanical trailing curtain 902 operates according to a predetermined shutter speed, so that the camera photographing operation may be performed. Referring to FIG. 9F, the mechanical trailing curtain 902 travels and the imaging device 901 is completely shielded from light. At this time, the camera photographing operation ends. Thereafter, in order to return the mechanical trailing curtain 902 to the live view mode, referring to FIGS. 9G and 9H, the mechanical trailing curtain 902 is raised again by a motor.

FIGS. 9I and 9J show operations of the mechanical trailing curtain 902 and the mechanical leading curtain 903 when there is a change in the orientation of a camera after the camera photographing operation ends. Referring to FIG. 9I, the mechanical trailing curtain 902 and the mechanical leading curtain 903 are simultaneously raised and then, referring to FIG. 9J, the mechanical leading curtain 903 immediately travels, and thus, the traveling characteristics of the mechanical leading curtain 903 may be detected as described above. An electronic leading curtain scan signal may be corrected according to the detected traveling characteristics of the mechanical leading curtain 903.

Figure 10:
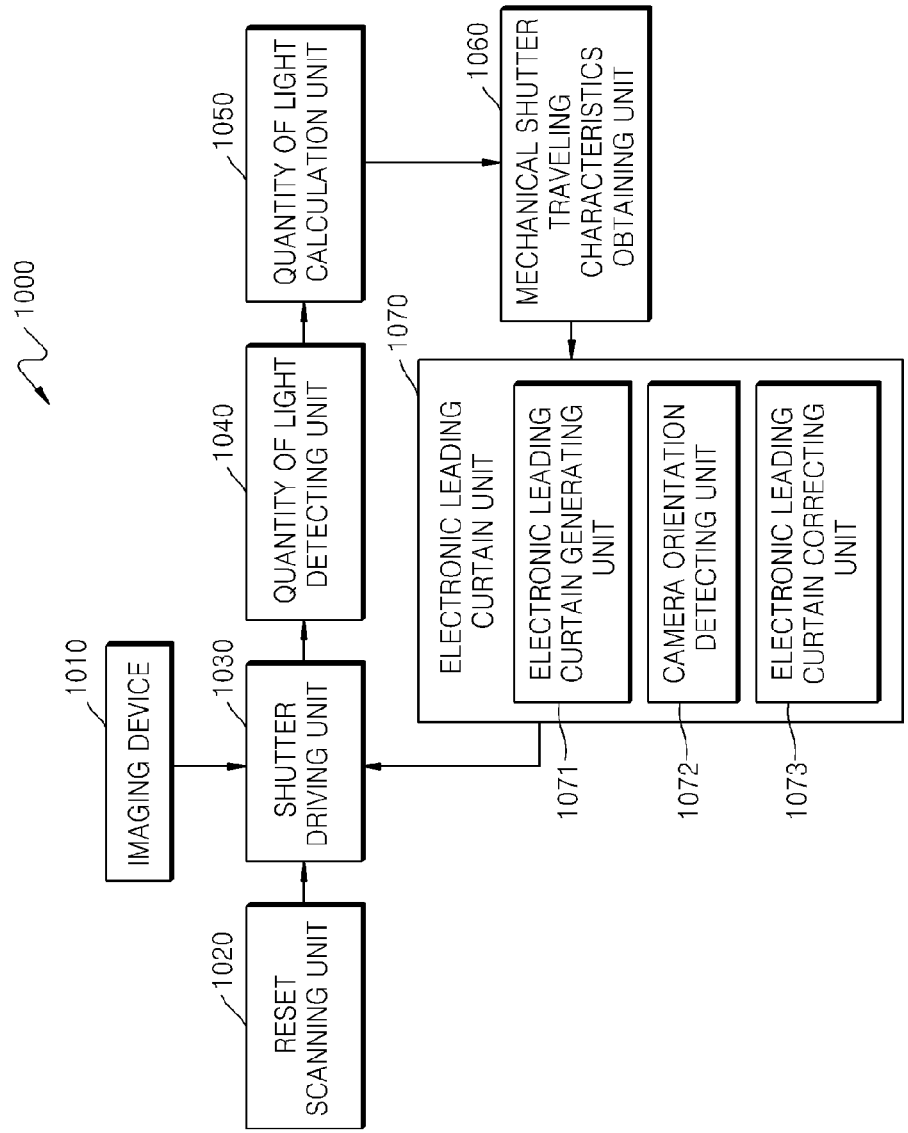
FIG. 10 is a block diagram illustrating an apparatus for detecting traveling characteristics of a mechanical shutter, according to an embodiment of the present invention.

FIG. 10 is a block diagram illustrating an apparatus 1000 for detecting traveling characteristics of a mechanical shutter, according to an embodiment of the present invention. Descriptions that are the same as those with reference to FIGS. 3-5 and 8 are not repeated.

Referring to FIG. 10, the apparatus 1000 for detecting the traveling characteristics of the mechanical shutter includes an imaging device 1010, a reset scanning unit 1020, a shutter driving unit 1030, a quantity of light detecting unit 1040, a quantity of light calculation unit 1050, a mechanical shutter traveling characteristics obtaining unit 1060, and an electronic leading curtain unit 1070. The electronic leading curtain unit 1070 includes an electronic leading curtain generating unit 1071, a camera orientation detecting unit 1072, and an electronic leading curtain correcting unit 1073.

The imaging device 1010 includes a plurality of pixels arranged in a pixel array having rows and columns.

The reset scanning unit 1020 performs a reset scanning operation on the pixels of the imaging device 1010 at a predetermined speed. Reset scanning sets a quantity of charges accumulated in the pixels to 0. A speed of reset scanning is equal to a traveling speed of a mechanical leading curtain or a mechanical trailing curtain.

The shutter driving unit 1030 allows the mechanical leading curtain or the mechanical trailing curtain to travel. The shutter driving unit 1030 allows the mechanical leading curtain to travel and initiate an exposure operation on the imaging device 1010 in order to obtain traveling characteristics of the mechanical leading curtain, and allows the mechanical trailing curtain to travel and shield the imaging device 1010 from light in order to obtain traveling characteristics of the mechanical trailing curtain. As described with reference to FIGS. 3 and 8, the traveling characteristics of the mechanical leading curtain and the mechanical trailing curtain are non-linear due to mechanical characteristics. The traveling characteristics of an ideal mechanical leading curtain and the mechanical trailing curtain may be linear.

The quantity of light detecting unit 1040 detects quantities of light of the imaging device 1010 based on a voltage read from the pixels of the imaging device 1010.

The quantity of light detecting unit 1040 reads pixels of even rows or odd rows of the imaging device 1010 based on a predetermined direction and detects first quantities of light before the shutter driving unit 1030 allows the mechanical trailing curtain to travel after the reset scanning unit 1020 performs the reset scanning operation on the pixels. The quantity of light detecting unit 1040 reads pixels of rows that are different from the rows read to detect the first quantities of light after the shutter driving unit 1030 allows the mechanical trailing curtain to shield the imaging device 101 from light. When the quantities of light detecting unit 1040 reads the pixels of the even rows of the imaging device 1010 and detects the first quantities of light, the quantity of light detecting unit 1040 reads the pixels of the odd rows of the imaging device 1010 and detects second quantities of light. The predetermined direction is a direction in which the mechanical trailing curtain travels. The time taken to read the pixels is equal to the reset scanning time and a traveling speed of the mechanical trailing curtain.

The quantity of light calculation unit 1050 sums the detected first quantities of light and sums the detected second quantities of light. Comparing summed quantities of light is merely an embodiment of the present invention, and the traveling characteristics of the mechanical trailing curtain may be detected based on quantities of light in various ways.

The mechanical shutter traveling characteristics obtaining unit 1060 compares the summed first quantities of light with the summed second quantities of light and obtains traveling characteristics of the mechanical leading curtain or the mechanical trailing curtain. For an ideal mechanical leading curtain or an ideal mechanical trailing curtain, the summed first quantities of light are equal to the summed second quantities of light. However, since the traveling characteristics of the mechanical leading curtain or the mechanical trailing curtain are non-linear, the summed first quantities of light are different from the summed second quantities of light. The mechanical shutter traveling characteristics obtaining unit 1060 obtains traveling characteristics of the mechanical leading curtain or the mechanical trailing curtain from the difference between the summed first quantities of light and the summed second quantities of light.

The electronic leading curtain unit 1070 generates an electronic leading curtain for initiating an exposure operation on the imaging device 1010 based on the obtained traveling characteristics of the mechanical leading curtain or the mechanical trailing curtain.

In more detail, the electronic leading curtain generating unit 1071 generates a scan signal for initiating accumulation of charges to initiate the exposure operation on the imaging device 1010 based on the obtained traveling characteristics of the mechanical leading curtain or the mechanical trailing curtain. Specifically, the electronic leading curtain generating unit 1071 generates the scan signal for realizing the electronic leading curtain having a scan pattern corresponding to the obtained traveling characteristics of the mechanical leading curtain or the mechanical trailing curtain. The electronic leading curtain and the mechanical trailing curtain having the same traveling characteristics make it possible to perform a photographing operation with an exact quantity of exposure light. When there is no change in the orientation of a camera after the photographing operation is performed, the photographing operation is continuously performed using the realized electronic leading curtain.

When the electronic leading curtain is realized using the traveling characteristics of the mechanical trailing curtain, if there is a change in the orientation of the camera, the currently detected traveling characteristics of the mechanical trailing curtain are not equal to the traveling characteristics of the mechanical trailing curtain according to the change in orientation of the camera. However, since the mechanical trailing curtain travels again whenever the orientation of the camera changes, additional traveling time is needed. Thus, if the orientation of the camera changes, the camera orientation detecting unit 1072 detects the changed orientation of the camera using an orientation change detection sensor. Thereafter, the electronic leading curtain correcting unit 1073 corrects an electronic leading curtain scan signal using orientation change correction data corresponding to the orientation stored in a predetermined storage unit.

When the electronic leading curtain is realized using the traveling characteristics of the mechanical leading curtain, if there is a change in the orientation of the camera, the camera orientation detecting unit 1072 and the electronic leading curtain correcting unit 1073 may correct the electronic leading curtain scan signal. Furthermore, the mechanical shutter traveling characteristics obtaining unit 1060 may detect the traveling characteristics of the mechanical leading curtain, and the electronic leading curtain correcting unit 1073 may correct the electronic leading curtain scan signal according to the detected traveling characteristics of the mechanical leading curtain.

According to another embodiment of the present invention, the quantity of light detecting unit 1040 may not read pixels of even rows and odd rows of the entire region of the imaging device 1010, and instead may read pixels of even rows and odd rows of a partial region of the imaging device 1010. In this case, the apparatus 1000 for detecting the traveling characteristics of the mechanical shutter may select a partial region from the imaging device 1010, perform the reset scan operation on the selected region, and detect the first and second quantities of light. The apparatus 1000 for detecting the traveling characteristics of the mechanical shutter may select a plurality of partial regions from the imaging device 1010. The number of regions and the number of pixels of even rows and odd rows may be adjusted according to a shutter speed and a reading speed.

The present invention can also be implemented as computer-readable code on a computer-readable recording medium. The computer-readable recording medium is any data storage device that can store data, which can be thereafter read by a computer system. Examples of the computer-readable recording medium include a Read-Only Memory (ROM), a Random-Access Memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art to which the present invention pertains.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of detecting traveling characteristics of a mechanical shutter of a camera having an imaging device with a plurality of pixels arranged in a pixel array, which has rows and columns, and a shutter for adjusting a quantity of light exposure on the imaging device, the method comprising the steps of:
   detecting first quantities of light by reading pixels of even rows or odd rows of the imaging device, after performing a reset scan operation on the plurality of pixels of the imaging device;
   shielding the imaging device from light by causing a mechanical trailing curtain included in the shutter to travel;
   detecting second quantities of light by reading pixels of rows that are different from the rows read to detect the first quantities of light; and
   obtaining traveling characteristics of the mechanical trailing curtain based on the first quantities of light and the second quantities of light.

2. The method of claim 1, further comprising generating a scan signal for initiating accumulation of charges to initiate an exposure operation on the imaging device based on the obtained traveling characteristics of the mechanical trailing curtain.

3. The method of claim 1, further comprising selecting a partial region of the imaging device,
   wherein detecting the first quantities of light comprises detecting the first quantities of light from the selected partial region of the imaging device; and
   wherein detecting the second quantities of light comprises detecting the second quantities of light from the selected partial region of the imaging device.

4. The method of claim 3, wherein a number of the selected partial regions or a number of pixels in the even rows and the odd rows is adjusted according to a speed of reading the plurality of pixels of the imaging device.

5. The method of claim 1, wherein obtaining the traveling characteristics of the mechanical trailing curtain comprises:
   summing the first quantities of light and summing the second quantities of light; and
   obtaining the traveling characteristics of the mechanical trailing curtain by comparing the summed first quantities of light with the summed second quantities of light.

6. The method of claim 2, wherein generating the scan signal comprises:
   detecting an orientation of the camera, when the orientation of the camera changes; and
   correcting the scan signal for initiating accumulation of charges using orientation change correction data corresponding to the detected orientation of the camera.

7. A method of detecting traveling characteristics of a mechanical shutter of a camera having an imaging device with a plurality of pixels arranged in a pixel array, which has rows and columns, and a shutter for adjusting a quantity of light exposure on the imaging device, the method comprising the steps of
   initiating an exposure operation on the imaging device by causing a mechanical leading curtain included in the shutter to travel, after performing a reset scan operation on the plurality of pixels of the imaging device;
   detecting first quantities of light by reading pixels of even rows or odd rows of the imaging device, after the exposure operation is performed;
   detecting second quantities of light by reading pixels of rows that are different from the rows read to detect the first quantities of light, after the first quantities of light are detected; and
   obtaining traveling characteristics of the mechanical leading curtain based on the first quantities of light and the second quantities of light.

8. The method of claim 7, further comprising generating a scan signal for initiating accumulation of charges to initiate the exposure operation on the imaging device based on the obtained traveling characteristics of the mechanical leading curtain.

9. The method of claim 7, further comprising selecting a partial region of the imaging device,
   wherein detecting the first quantities of light comprises detecting the first quantities of light from the selected partial region of the imaging device; and
   wherein detecting the second quantities of light comprises detecting the second quantities of light from the selected partial region of the imaging device.

10. The method of claim 9, wherein a number of the selected partial regions or a number of pixels of the even rows and the odd rows is adjusted according to a speed of reading the plurality of pixels of the imaging device.

11. An apparatus for detecting traveling characteristics of a mechanical shutter of a camera having an imaging device with a plurality of pixels arranged in a pixel array, which has rows and columns, and a shutter for adjusting a quantity of light exposure on the imaging device, the apparatus comprising:
   a reset scanning unit for performing a reset scan operation on the plurality of pixels of the imaging device;
   a shutter driving unit for shielding the imaging device from light by causing a mechanical trailing curtain included in the shutter to travel;
   a quantity of light detecting unit for detecting first quantities of light by reading pixels of even rows or odd rows of the imaging device before causing the mechanical trailing curtain to travel after performing the reset scan operation, and detecting second quantities of light by reading pixels of rows that are different from the rows read to detect the first quantities of light after shielding the imaging device from light by the mechanical trailing curtain; and a mechanical shutter traveling characteristics detecting unit for obtaining traveling characteristics of the mechanical trailing curtain based on the first quantities of light and the second quantities of light.

12. The apparatus of claim 11, further comprising an electronic leading curtain generating unit for generating a scan signal for initiating accumulation of charges to initiate an exposure operation on the imaging device based on the obtained traveling characteristics of the mechanical trailing curtain.

13. The apparatus of claim 11, wherein the quantity of light detecting unit selects a partial region of the imaging device, and detects the first quantities of light and the second quantities of light from the selected partial region of the imaging device.

14. The apparatus of claim 13, wherein the quantity of light detecting unit adjusts a number of the selected partial regions or a number of pixels of the even rows and the odd rows according to a speed of reading the plurality of pixels of the imaging device.

15. The apparatus of claim 11, further comprising a quantity of light operation performing unit for summing the first quantities of light and summing the second quantities of light, wherein the mechanical shutter traveling characteristics detecting unit obtains the traveling characteristics of the mechanical trailing curtain by comparing the summed first quantities of light with the summed second quantities of light.

16. The apparatus of claim 12, wherein the electronic leading curtain generating unit comprises:

a camera orientation detecting unit for detecting an orientation of the camera, when the orientation of the camera changes; and an electronic leading curtain correction unit for correcting the scan signal for initiating accumulation of charges using orientation change correction data corresponding to the detected orientation of the camera.

17. An apparatus for detecting traveling characteristics of a mechanical shutter of a camera having an imaging device with a plurality of pixels arranged in a pixel array, which has rows and columns, and a shutter for adjusting a quantity of light exposure on the imaging device, the apparatus comprising:

a reset scanning unit for performing a reset scan operation on the plurality of pixels of the imaging device;

a shutter driving unit for initiating an exposure operation on the imaging device by causing a mechanical leading curtain included in the shutter to travel, after performing the reset scan operation;

a quantity of light detecting unit for detecting first quantities of light by reading pixels of even rows or odd rows of the imaging device after performing the exposure operation on the imaging device, and detecting second quantities of light by reading pixels of rows that are different from the rows read to detect the first quantities of light after detecting the first quantities of light; and a mechanical shutter traveling characteristics detecting unit for obtaining traveling characteristics of the mechanical leading curtain based on the first quantities of light and the second quantities of light.

18. The apparatus of claim 17, further comprising an electronic leading curtain generating unit for generating a scan signal for initiating accumulation of charges to initiate the exposure operation on the imaging device based on the obtained traveling characteristics of the mechanical leading curtain.

19. The apparatus of claim 17, wherein the quantity of light detecting unit selects a partial region of the imaging device, and detects the first quantities of light and the second quantities of light from the selected partial region of the imaging device.

20. The apparatus of claim 19, wherein the quantity of light detecting unit adjusts a number of the selected partial regions or a number of pixels of the even rows and the odd rows according to a speed of reading the plurality of pixels of the imaging device.

* * * * *